United States Patent [19]

Ichinose et al.

[11] Patent Number: 5,046,779
[45] Date of Patent: Sep. 10, 1991

[54] SUNROOF STRUCTURE FOR AUTOMOTIVE VEHICLE

[75] Inventors: Hisao Ichinose, Atsugi; Yoshimitsu Takeda, Zama, both of Japan

[73] Assignee: Nissan Motor Co., Ltd., Japan

[21] Appl. No.: 484,554

[22] Filed: Feb. 26, 1990

[30] Foreign Application Priority Data

Feb. 27, 1989 [JP] Japan .................... 1-21584[U]
Feb. 27, 1989 [JP] Japan .................... 1-45771

[51] Int. Cl.$^5$ ............................................... B60J 7/04
[52] U.S. Cl. .................................. 296/216; 296/213; 296/221
[58] Field of Search .................. 296/213, 215-216, 296/221-223

[56] References Cited

U.S. PATENT DOCUMENTS

| 4,509,791 | 4/1985 | Bienert et al. | 296/216 |
| 4,671,565 | 6/1987 | Grimm et al. | 296/222 X |
| 4,747,637 | 5/1988 | Lenoir et al. | 296/216 X |

FOREIGN PATENT DOCUMENTS

| 3525320 | 1/1987 | Fed. Rep. of Germany | 296/216 |
| 3606415 | 10/1988 | Fed Rep of Germany | |
| 0034521 | 4/1981 | Japan | 296/222 |
| 61-139817 | 8/1986 | Japan | |
| 62-85716 | 4/1987 | Japan | |
| 2142586 | 1/1985 | United Kingdom | 296/222 |

Primary Examiner—Dennis H. Pedder
Attorney, Agent, or Firm—Lowe, Price, LeBlanc & Becker

[57] ABSTRACT

A sunroof structure for an automotive vehicle comprising a sunroof lid. The sunroof lid includes a center panel made of glass. A surrounding panel formed of sheet metal is securely fixed around the center panel. The surrounding panel is formed thereunder with a link receiving space in which a link bracket of a driving link mechanism is received. The link bracket is drivingly connected to the surrounding panel so that the driving link mechanism drives the sunroof lid.

11 Claims, 4 Drawing Sheets

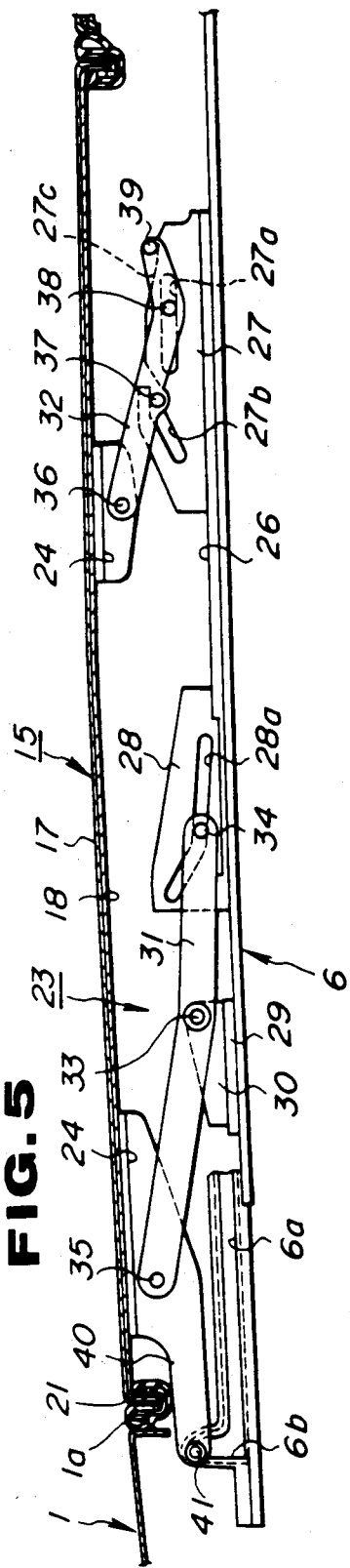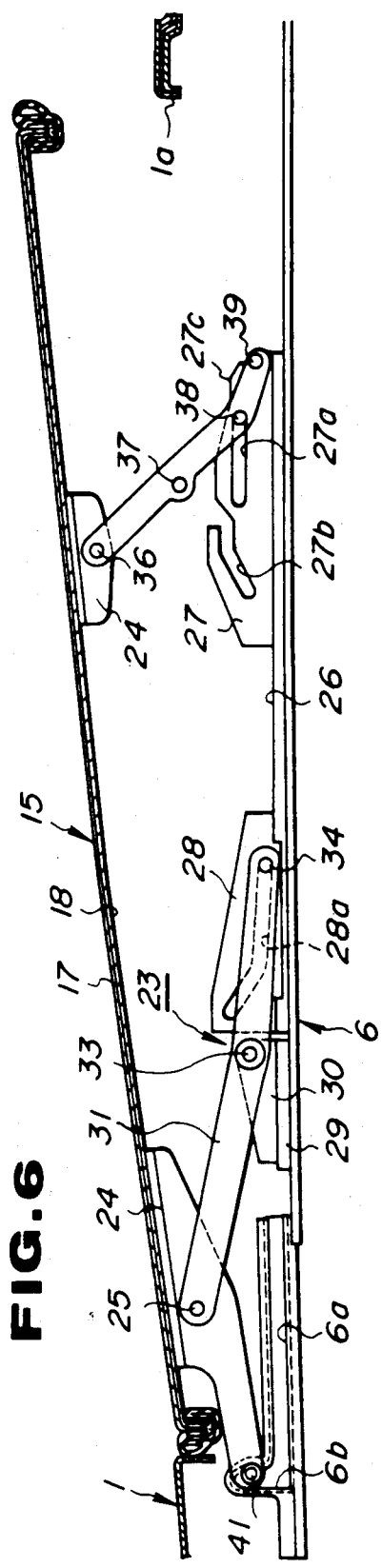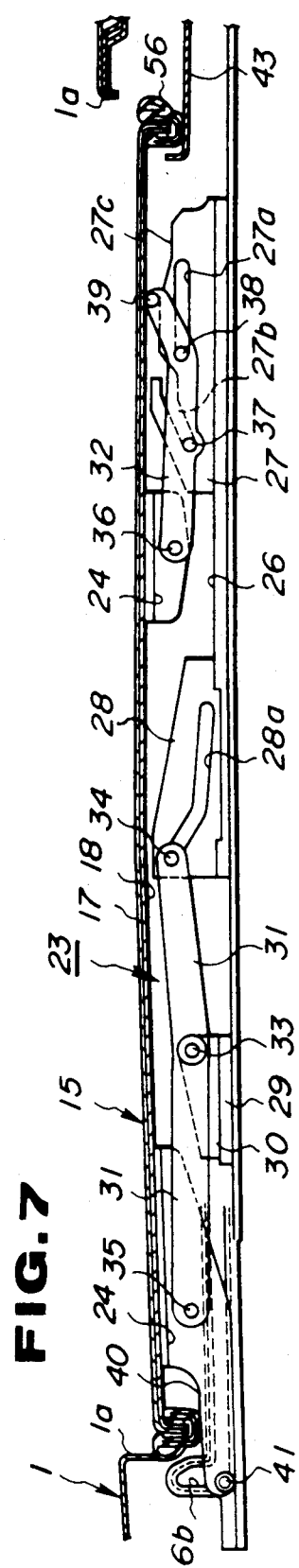

SUNROOF STRUCTURE FOR AUTOMOTIVE VEHICLE

BACKGROUND OF THE INVENTION

1. Field of the Invention

This invention relates to improvements in a sunroof structure for an automotive vehicle, and more particularly to an installation structure of a driving link mechanism for the sunroof lid.

2. Description of the Prior Art

It is well known that an automotive vehicle is provided with a sunroof including a sunroof lid which is movably fitted in a roof opening. The sunroof lid is driven by a driving link mechanism which is disclosed, for example, in Japanese Utility Model Provisional Publication No. 61-139817. The sunroof lid is fixedly provided at its lower surface with a retainer plate to which a link bracket of the driving link mechanism is fixed with a bolt and a nut. Furthermore, a link end guide of the driving link mechanism is pivotally connected to the link bracket and slidably connected to a guide rail disposed along the lateral periphery of the roof opening. With this structure, the retainer plate and the link bracket and link members connecting them are assembled and located under the sunroof lid formed of a relatively thick and transparent panel. As a result, the total height dimension of a sunroof assembly including the driving link mechanism becomes larger. This enlarges the height dimension from the sunroof lid to the guide rail, thereby reducing a passenger's head clearance.

SUMMARY OF THE INVENTION

It is an object of the present invention to provide an improved sunroof structure which provides an enlarged head clearance for a passenger without changing the height dimension of an automotive vehicle.

Another object of the present invention is to provide an improved sunroof structure in which the location of a sunroof lid driving link mechanism and guide rails therefor is raised relative to a conventional sunroof structure to enlarge a space between a driver's head and the driving link mechanism.

A sunroof structure of the present invention for an automotive vehicle comprises a roof panel having a roof opening. A guide rail is disposed under level of the roof panel to extend along the longitudinal direction of the vehicle. A sunroof lid is fittable within the roof opening and slidable along the guide rail. The sunroof lid includes a center panel through which light passes. A surrounding panel is securely connected to the center panel and disposed around the periphery of the center panel. The surrounding panel is formed of hard sheet to define thereunder a link receiving space. Additionally, a driving link mechanism is provided in such a manner the sunroof lid is drivably connected to the guide rail through the driving link mechanism. The driving link mechanism includes a link bracket which is connected to the surrounding panel and disposed within the link receiving space.

Accordingly, the height dimension from the guide rail to the sunroof lid can be reduced by a dimensional amount to receive the link bracket within the link receiving space. As a result, the passenger's head clearance is effectively enlarged. This causes a remarkable effect improving living comfortableness of the vehicle passenger.

BRIEF DESCRIPTION OF THE DRAWINGS

FIG. 5 is a cross-sectional view of the sunroof structure of FIG. 1 taken along the line V—V of FIG. 1, showing an operational mode of the sunroof structure;

FIG. 6 is a cross-sectional view similar to FIG. 5 but showing another operational mode;

FIG. 7 is a cross-sectional view similar to FIG. 5 but showing a further operational mode;

DETAILED DESCRIPTION OF THE INVENTION

Figure 1:
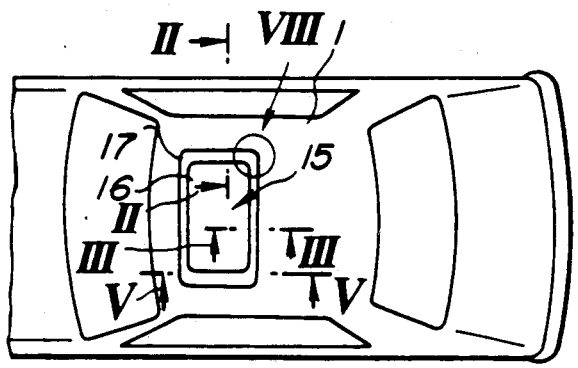
FIG. 1 is a schematic plan view of an automotive vehicle provided with an embodiment of a sunroof structure according to the present invention.

Referring now to FIGS. 1 to 9, an embodiment of a sunroof structure according to the present invention is illustrated. The sunroof structure of this embodiment is of an automotive vehicle and comprises a roof panel 1 having a roof opening 2 of generally rectangular shape. The roof panel 1 is reinforced with a pair of side reinforcement members 3 fastened to the roof panel 1 near the peripheral lateral side of the roof opening 2. Each side reinforcement member 3 has a plurality of brackets 4 fixed to a guide rail 6. In this embodiment, each bracket 4 is formed by bending the tip end section of the side reinforcement member 3 inward into an L-shape. Each bracket 4 is separate from and does not contact with a roof side rail 5 fixed to a vehicular body during joining of the roof panel 1 with the roof side rail 5. Accordingly, the dimension of the roof opening 2 in the direction of width is enlarged and the guide rail 6 can be disposed considerably near the roof side rail 5. Thus, a relatively large clearance or passenger head room is formed between the head top of a passenger and the inner side of a vehicular roof.

An installation seat section 7 for the side reinforcement member 3 is formed at an outer section of the guide rail 6 while a rising wall 8 defining a drip channel 9 is formed at the outer section and located outside of the installation seat section 7. The rising wall 8 is disposed outside of each side reinforcement member 3. Each bracket 4 is fixed to the installation seat section 7 with a small screw 10. The drip channel 9 is formed between the rising wall 8 and the outer side section of the side reinforcement member 3 which cannot be seen from the outside of the vehicle thereby improving the appearance of the sunroof structure. A bracket 11 is horizontally outwardly protruded from the rising wall 8 at the under side section. The bracket 11 is fixed to a body side bracket 13 with a bolt 12a and a nut 12b. The body side bracket 13 is fixed to the roof side rail 5 with a bolt 14a and a nut 14b, so that the guide rail 6 is substantially supported by the roof side rail 5. The roof side rail 5 is adapted to receive a load of a sunroof unit U including a sunroof lid 15, a driving link mechanism 23 and the like, thereby improving the installation rigidity of the sunroof unit U.

Sunroof lid 15 is slidably guided in the forward and rearward directions along the guide rail 6. The sunroof lid 15 includes a center panel 16 made of transparent or translucent plate such as glass or plastic. A surrounding panel 17 made of a hard sheet such as sheet metal is fixed around the center panel 16. An inner panel 18 is connected to the lower surface of the surrounding panel 17 and includes a horizontal section 19 generally parallel with the guide rail 6. The horizontal section 19 is located under the surrounding panel 17. An overhang section 20 of the inner panel 18 extends inward over the inner peripheral section of the surrounding panel 17. The inner periphral section of the surrounding panel 17 extends downwardly and is engaged with a retainer 16a fixed to the outer peripheral section of the center panel 16, in such a manner that the outer surface of the surrounding panel 17 is flush with the outer surface of the center panel 16. The end portion of the overhang section 20 of the inner panel 18 is resiliently contacted with the inner surface of the center panel 16. Therefore, the surrounding panel 17 is tightly connected to the outer peripheral section of the center panel 16. In this arrangement, a link receiving space 22 is formed under the surrounding panel 17 so as to be surrounded by the overhang section 20 and the outer flange 21 of the inner panel 18.

Figure 4:
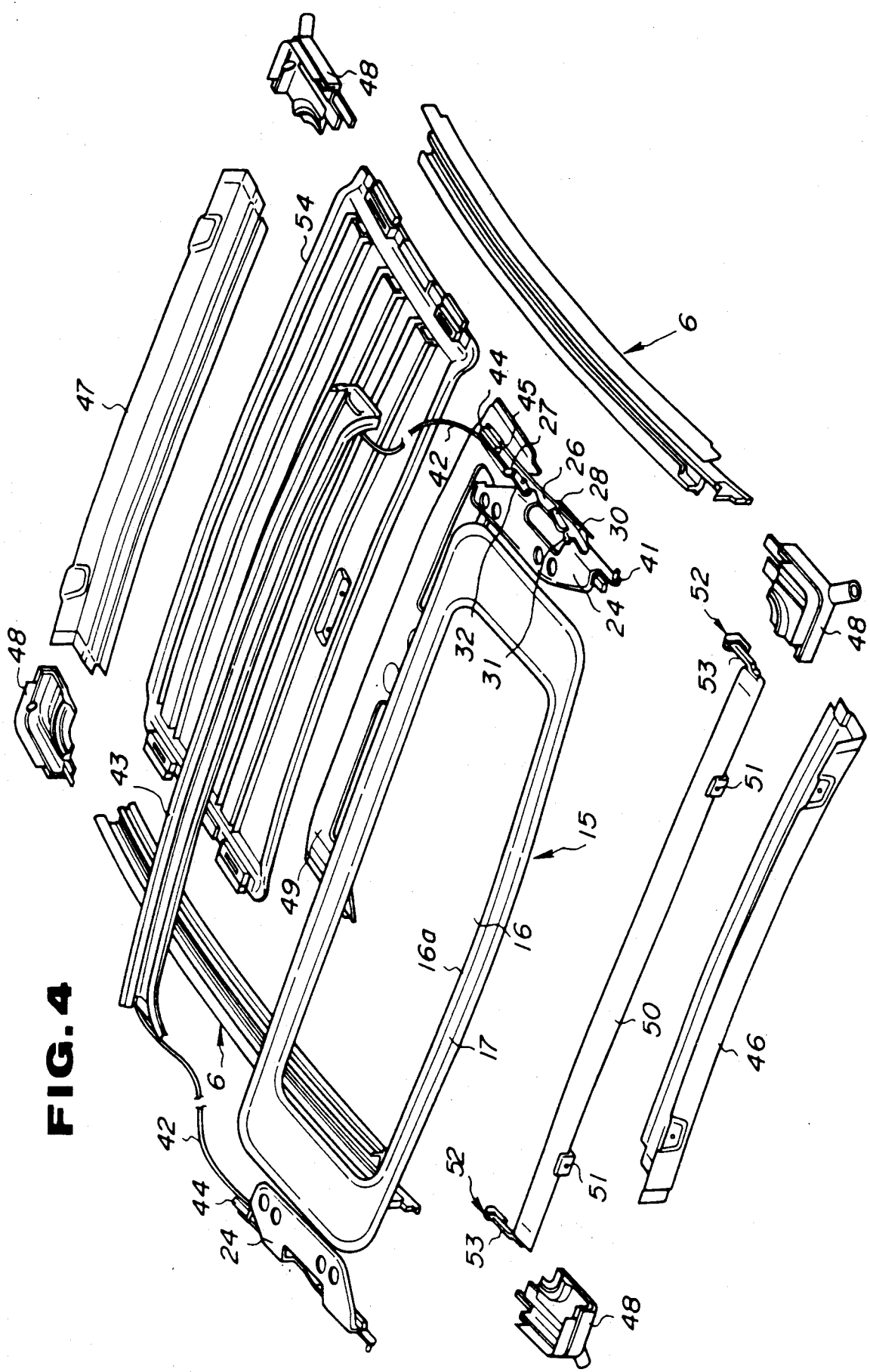
FIG. 4 is an exploded perspective view of the sunroof structure of FIG. 1.

A driving link mechanism 23 drives the sunroof lid 15 and includes a link bracket 24 disposed in the link receiving space 22 and fixed to the horizontal section 19 of the inner panel 18 with a bolt 25a and a nut 25b, in which the link bracket 24 serves as a base in the assembly. The driving link mechanism 23 includes a rear guide 27, a front guide 30, a front link 31, a rear link 32 and the like. The rear guide 27 and the front sub-guide 28 are fixedly mounted on a rear guide shoe 26 engaged with the guide rail 6. The front guide 30 is fixedly mounted on a front guide shoe 29 engaged with the guide rail 6. The front link 31 interconnects the link bracket 24 with the guides 28, 29. The rear link 32 interconnects the link bracket 24 with the guide 27. The front link 31 is pivotally connected at its central section with the front guide 30 through a pin 33 and is slidably connected at its rear end section with the guide slot 28a of the guide 28. The front link 31 is pivotally connected at its front end section with the front link bracket 24 through a pin 35. The rear link 32 is pivotally connected at its front end section with the rear end section of the rear link bracket 24 through a pin 36. First, second and third guide pins 37, 38, 39 are fixedly provided in the rear link 32. The first guide pin 37 is slidably engaged with a cam groove 27b formed in the rear guide 27. The second guide pin 38 is slidably engaged with a guide slot 27a formed in the rear guide 27. The third guide pin 39 is slidably engaged with a cam surface 27c formed in the rear guide 27. An arm section 40 is formed at the front end part of the link bracket 24 and extend forward. A guide pin 41 at the end of the arm section 40 is slidably connected to a rail groove 6a which is formed at the front section of the guide rail 6. A rising groove 6b is formed contiguous with the front end of the rail groove 6. The sunroof lid 15 can be tilted up upon being pivotally moved around an engaged point at which the guide pin 41 and the upper end portion of the rising groove 6b are engaged with each other. The rear guide shoe 26 is interconnected to a drive wire 42 which is driven by a motor through a speed reducer (not shown). Therefore, the rear guide 27 and the front sub-guide 28 simultaneously slide forward and rearward under the pushing and pulling actions of the drive wire 42. The front guide shoe 29 of the front guide 30 is connected to a drain shoe 44 which is connected to the rear drain 43 through a rod 45 passing through the rear guide shoe 26. Therefore, the front guide 30 and the rear drain 43 simultaneously slide forward and rearward. As shown in FIG. 4, front and rear traversers 46, 47 are respectively connected with the front and rear end sections of each guide rail 6 through corner pieces 48. A reinforcement traverser 49 is disposed at the rear side section of each guide rail 6 so as to connect the right and left guide rails 6. A deflector 50 is connected to the front section of the front traverser 46 and is supported at its both side edges by link mechanisms 52 fixed on the front end sections of both guide rails 6. When a link member 53 of the link mechanism 52 is pushed or pulled by the front end section of the sunroof lid 15, the deflector 50 is provided or withdrawn relative to the roof opening 2 upon the opening or closing action of the sunroof lid 15. A shade 54 is provided to be slidably moved along the right and left guide rails 6 under the sunroof lid 15.

The manner of operation of the thus arranged sunroof structure will now be described.

When the rear guide shoe 26 is pushed forward by the drive wire 42 into the position of FIG. 5, the guide pin 34 of the front link 31 is moved toward the rear stop end section of the guide slot 28a of the front sub guide 28. The first, second and third guide pins 37, 38, 39 are respectively moved to the rear sections of the cam groove 27b, the guide slit 27a and the cam surface 27c of the rear guide 27. The first guide pin 37 is released from the cam groove 27b while the third guide pin 39 is moved to a recess which is located at the back section of the cam surface 27c. As a result, the sunroof lid 15 is tilted up upon being pivoted around the guide pin 41 of the arm section 40 of the front end of the link bracket 24 as shown in FIG. 6. Thus the condition in FIG. 5 is changed to a condition in FIG. 6.

Figure 2:
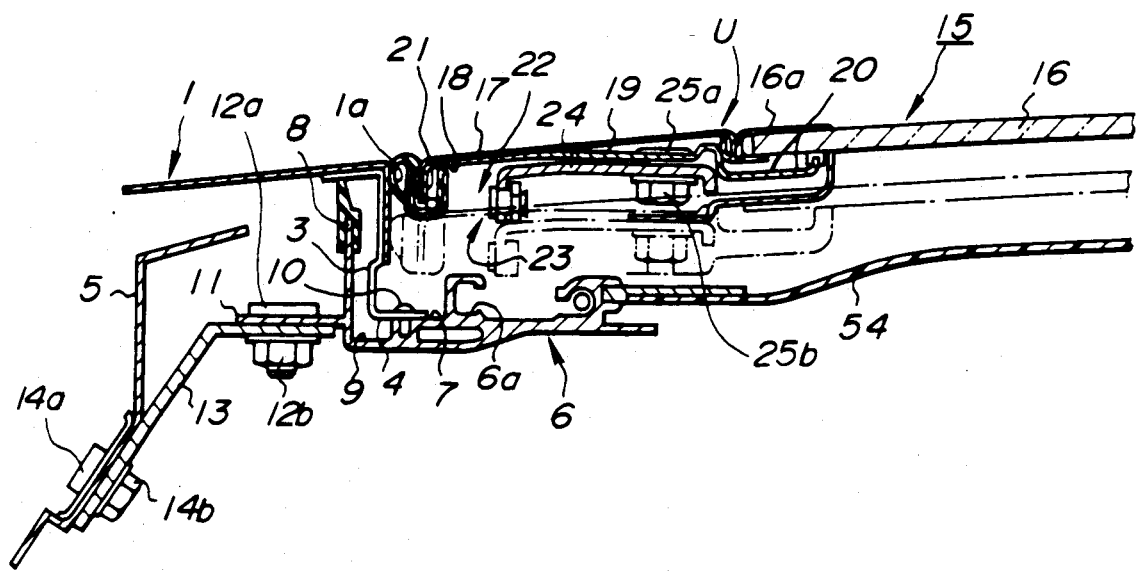
FIG. 2 is a cross-sectional view of an essential part of the sunroof structure of FIG. 1, taken along the line II—II of FIG. 1.
Figure 3:
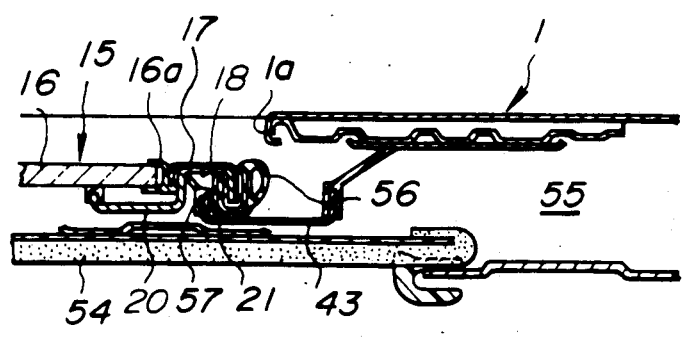
FIG. 3 is a cross-sectional view of anoter essential part of the sunroof structure of FIG. 1, taken along the line III—III of FIG. 1.

When the rear guide shoe 26 is pulled rearward by the drive wire 42 in the condition of FIG. 5 in which the sunroof lid 15 is at a closing position, the guide pin 34 of the front link 31 is moved to the front end stop section of the guide slot 28a of the front sub slot 28 under the rearward movement of the rear guide shoe 26. Then the first, second and third guide pins 37, 38, 39 are slidingly moved respectively to the front side sections of the cam groove 27b, the guide slot 27a and the cam surface 27c. Accordingly, the sun roof lid 15 once shifts down to its lower position from the closing position. With this movement, the guide pin 41 of the arm section 40 moves toward the bottom of the rising groove 6b. Thus, a rear part of the end flange 21 disposed at the back section of the surrounding panel 17 slides onto the rear drain 43 so as to engage with each other as shown in FIG. 2. The rear part of the end flange 21 and the rear drain 43 are double sealed with weather strips 56, 57 in the forward and rearward direction. After such a downward movement of the sunroof lid 15, the sunroof lid, the front guide 30 and the rear drain 43 are slidably moved into a sunroof receiving space 55 along the guide rail 6, thereby causing the roof opening 2 to open.

The advantageous effects of the thus arranged sunroof structure will be discussed. The height dimension between the sunroof lid 15 and the guide rail 6 can be reduced a by the dimension of a part of the link bracket 24 received in the link receiving space 22 under the surrounding panel 17 formed of the hard sheet. Additionally, by forming the link receiving space 22 under the surrounding panel 17, when the sunroof lid 15 is moved downward, the back end section of the surrounding panel 17 is engaged at its outer flange 21 with the front edge flange of the rear drain 43 to be offset each other. As a result, the guide rail 6 can be located near the side of the roof panel 1, thereby shortening the total height dimension of the sunroof unit U. Thus, the passenger's head clearance is increased. Especially by virtue of the fact that the interference of the bracket 4 with the roof side rail 5 is avoided during assembly operation by inwardly bending the bracket 4 of the side reinforcement member 3 connected to side periphery of the roof opening 2, the dimension of the roof opening 2 in the vehicle width direction is enlarged. Additionally, if the set position of the guide rail 6 is made close to the roof side rail 5, the above-mentioned head clearance is further enlarged since the guide rail 6 is offset from the upward side of the passenger's head to the lateral side of the roof, thereby improving living comfortableness for the passenger.

Figure 8:
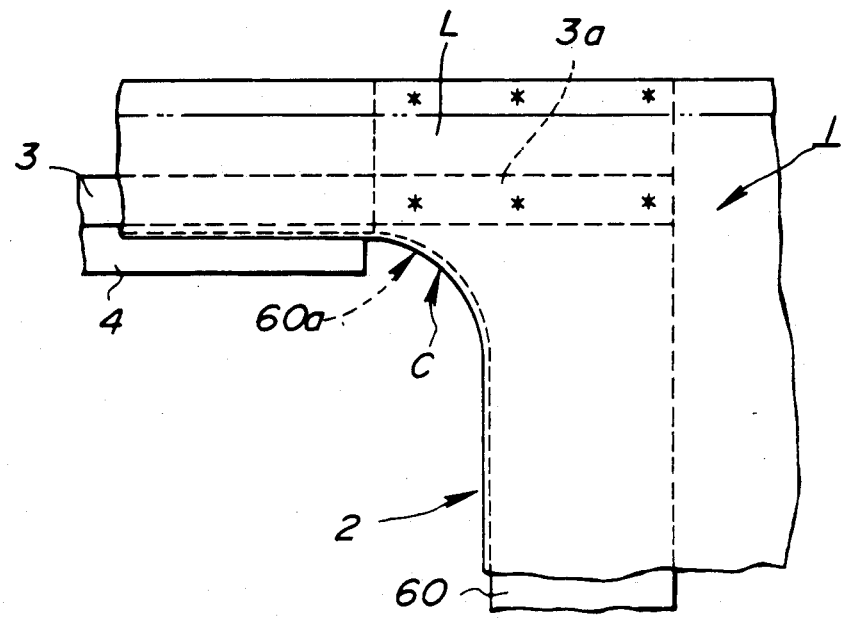
FIG. 8 is a fragmentary plan view of an essential part (indicated by a circle VIII in FIG. 1) of the sunroof structure of FIG. 1, showing a corner of a roof opening.
Figure 9:
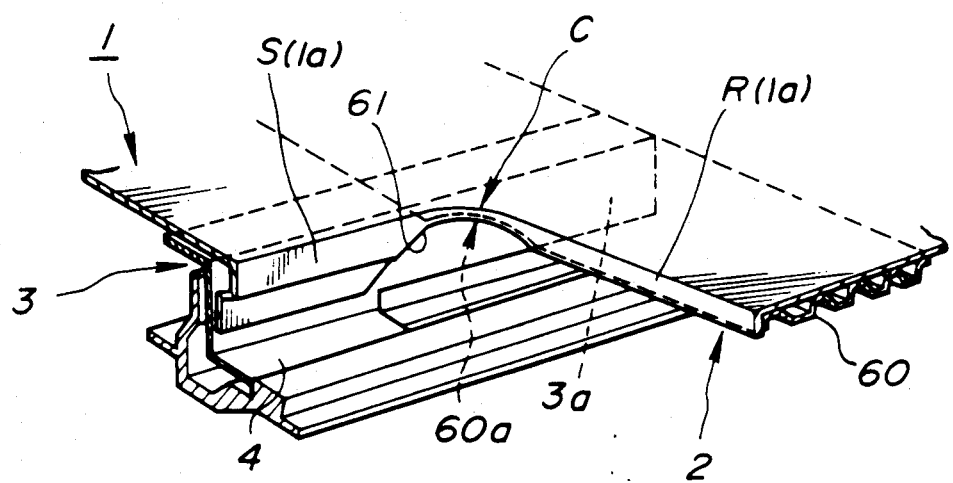
FIG. 9 is a fragmentary perspective view of the essential part of FIG. 8.

FIGS. 8 and 9 illustrate an example of a structure in connection with the corner of the roof opening 2. The roof panel 1 is formed along its periphery defining the roof opening 2 with a peripheral edge flange 1a which extends downwardly or generally perpendicularly to the roof panel 1. The peripheral edge flange 1a includes a side section S extending along the side reinforcement member 3 or in the longitudinal direction of the vehicle. The peripheral edge flange 1a further includes a rear section R which is integral with and perpendicular to the side section S. The rear section R is formed smaller in width than the side section S, so that the rear section R does not interfere with the sunroof lid 15 when the sunroof lid is slidingly moved into the receiving space 55 formed under the roof panel 1. Since the rear section R is different in width from the side section S, a corner C of the peripheral edge flange 1a is formed with a cutout 61. A rear reinforcement member 60 is disposed under the roof panel 1 rearwardly of the roof opening 2 so as to be in contact with the peripheral edge flange rear section R. The opposite end sections of the rear reinforcement member 60 are connected to the opposite lateral sides L of the roof panel 1. The end section of the rear reinforcement member 60 is formed with a curved corner section 60a which is connected and disposed under the roof panel 1 along the corner C so as to slightly extend along the side reinforcement member 3. The side reinforcement member 3 is disposed under the roof panel 1 and extends along the peripheral edge flange side section S in a manner to be in contact with the side section S and with the end section of the rear reinforcement member 60. The side reinforcement member 3 straight extends rearward of the side roof opening 2 to form an extending section 3a. Thus, the extending section 3a is located at the back side of the cutout 61 so as to close the cutout 61.

With the structure of FIGS. 8 and 9, the corner C is formed at each of the peripheral flanges S defining the roof opening 2, and therefore is reinforced by the curved corner section 60a which is connected to the corner C. Since the cutout 61 of the corner C is located with the extending section 3a of the rear reinforcement member 60, the inner structure of the roof panel 1 cannot be seen through the cutout 61 when the roof opening 2 is opened. Therefore, the appearance and quality of the vehicle body can be improved while maintaining the rigidity of the corner C. The extending section 3a of the side reinforcement member 3 and the end of the rear reinforcement member 60 are joined upon being completely overlapped with each other, and therefore the rigidity of the roof panel around the roof opening 2 is further improved.

What is claimed is:

1. A sunroof structure for an automotive vehicle, comprising:
    a roof panel having a roof opening;
    a guide rail disposed under level of said roof panel and extending in a lengthwise direction of the vehicle;
    a sunroof lid fittable within said roof opening and slidable along said guide rail, said sunroof lid including a center panel through which light passes, and a surrounding panel securely connected to said center panel and disposed around the periphery of said center panel, said surrounding panel being formed of hard sheet to define thereunder a link receiving space, said surrounding panel including a flat main section having an upper surface which is generally flush with an upper surface of said center panel; and
    a driving link mechanism through which said sunroof lid is drivably connected to said guide rail, said driving mechanism including a link bracket connected to said surrounding panel, said link bracket being disposed under said flat main section.

2. A sunroof structure as claimed in claim 1, wherein said surrounding panel is formed as an endless member extending along an entire periphery of said center panel, said surrounding panel including a generally flat main section, and inner and outer flanges extending generally perpendicular respectively from the inner and outer peripheral sections of said flat main section, said inner flange being securely connected to said center panel, said inner and outer flanges defining therebetween said link receiving space.

3. A sunroof structure as claimed in claim 1, further comprising an inner panel fixed to said sunroof lid surrounding panel, at least a part of said inner panel being located below said surrounding panel, said inner panel having an overhang section located below a peripheral section of said center panel to support said center panel.

4. A sunroof structure as claimed in claim 2, further comprising a rear drain through which rain water is drained, said rear drain being located rearward of said sunroof lid and extending generally in a direction perpendicular to said guide rail, said rear drain being movable to be retracted into a sunroof lid receiving space defined under said roof panel.

5. A sunroof structure as claimed in claim 4, wherein said surrounding panel outer flange is locatable within said recess of said rear drain.

6. A sunroof structure as claimed in claim 1, wherein said roof panel includes peripheral edge flanges extending downward to define said roof opening, said peripheral edge flanges respectively including side sections extending in the vehicle lengthwise direction, and a rear section located rearward of said side sections and extending perpendicular to said side sections, said rear section being smaller in depth than said side sections, said side and rear sections being integral with each other to form a corner whose lower edge curves to connect lower edges of said side and rear sections.

7. A sunroof structure as claimed in claim 6, further comprising a pair of side reinforcement members fastened respectively to the side sections of said roof panel, said side reinforcement members being located below said roof panel and respectively adjacent said peripheral edge flange side sections, said side reinforcement members being generally straight and extending parallel with said respective peripheral edge flanges and rearward of said corner, and a rear reinforcement member fastened to said roof panel and located below said roof panel and in the vicinity of said roof opening, said rear reinforcement member extending generally perpendicular to said side reinforcement members.

8. A sunroof structure as claimed in claim 7, wherein said side reinforcement member is in contact with said peripheral edge flange side section, and said rear reinforcement member is in contact with said peripheral edge flange rear section.

9. A sunroof structure as claimed in claim 1, wherein said sunroof lid central panel is made of a material selected from the group constituting of glass and plastic.

10. A sunroof structure as claimed in claim 1, wherein said sunroof lid surrounding panel is formed of metal sheet.

11. A sunroof structure for an automotive vehicle, comprising:

a roof panel having a roof opening;

a guide rail disposed under level of said roof panel and extending in a lengthwise direction of the vehicle;

a sunroof lid fittable within said roof opening and slidable along said guide rail, said sunroof lid including a center panel through which light passes, and a surrounding panel securely connected to said center panel and disposed around the periphery of said center panel, said surrounding panel being formed of hard sheet to define thereunder a link receiving space, said surrounding panel being formed as an endless member extending along the entire periphery of said center panel, said surrounding panel including a generally flat main section, and inner and outer flanges extending generally perpendicular respectively from inner and outer peripheral sections of said flat main section, said flat main section of said surrounding panel having an upper surface which is generally flush with an upper surface of said center panel, said inner flange being securely connected to said center panel, said inner and outer flanges defining therebetween said link receiving space; and a driving link mechanism through which said sunroof lid is drivably connected to said guide rail, said driving mechanism including a link bracket connected to said surrounding panel, said link bracket being disposed within said link receiving space.

* * * * *